US012147854B2

(12) United States Patent
Chang et al.

(10) Patent No.: US 12,147,854 B2
(45) Date of Patent: Nov. 19, 2024

(54) ENABLING CLEANING MODE FOR INFORMATION HANDLING SYSTEMS (71) Applicant: DELL PRODUCTS L.P., Round Rock, TX (US)

(72) Inventors: Chen Hsin Chang, Keelung (TW); Yao-Tsung Chang, Taipei (TW); Li Min Wu, Taoyuan (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/172,480

(22) Filed: Feb. 22, 2023

(65) Prior Publication Data
US 2024/0281309 A1 Aug. 22, 2024

(51) Int. Cl.
G06F 3/042 (2006.01)
G06F 1/16 (2006.01)
G06F 3/02 (2006.01)
G06F 3/0354 (2013.01)
G06F 3/041 (2006.01)
G06F 9/451 (2018.01)
G06F 9/54 (2006.01)

(52) U.S. Cl.
CPC ............ *G06F 9/542* (2013.01); *G06F 1/1615* (2013.01); *G06F 3/0227* (2013.01); *G06F 3/03547* (2013.01); *G06F 3/0416* (2013.01); *G06F 9/451* (2018.02)

(58) Field of Classification Search
CPC ........ G06F 9/542; G06F 9/451; G06F 3/0227; G06F 3/03547; G06F 3/0416
USPC ....................................................... 345/173
See application file for complete search history.

(56) References Cited

U.S. PATENT DOCUMENTS

| 11,422,590 B2 | 8/2022 | Hamlin et al. | |
| 2014/0300581 A1* | 10/2014 | Aurongzeb | A61L 2/10 345/175 |
| 2018/0088633 A1* | 3/2018 | Whitman | G06F 1/1677 |
| 2021/0211529 A1* | 7/2021 | Luo | G06F 1/266 |

* cited by examiner

Primary Examiner — Deeprose Subedi
(74) Attorney, Agent, or Firm — Larson Newman, LLP (57) ABSTRACT An information handling system may detect an event indicating a transition of the information handling system from a first mode to a second mode while the information handling system is in a working state. In response to detecting the event, the system may transition from the first mode to the second mode, disable a human interface device, and switch off a backlight of a display device.

20 Claims, 9 Drawing Sheets

ENABLING CLEANING MODE FOR INFORMATION HANDLING SYSTEMS

FIELD OF THE DISCLOSURE

The present disclosure generally relates to information handling systems, and more particularly relates to enabling a cleaning mode for information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may detect an event indicating a transition of the information handling system from a first mode to a second mode while the information handling system is in a working state. In response to detecting the event, the system may transition from the first mode to the second mode, disable a human interface device, and switch off a backlight of a display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
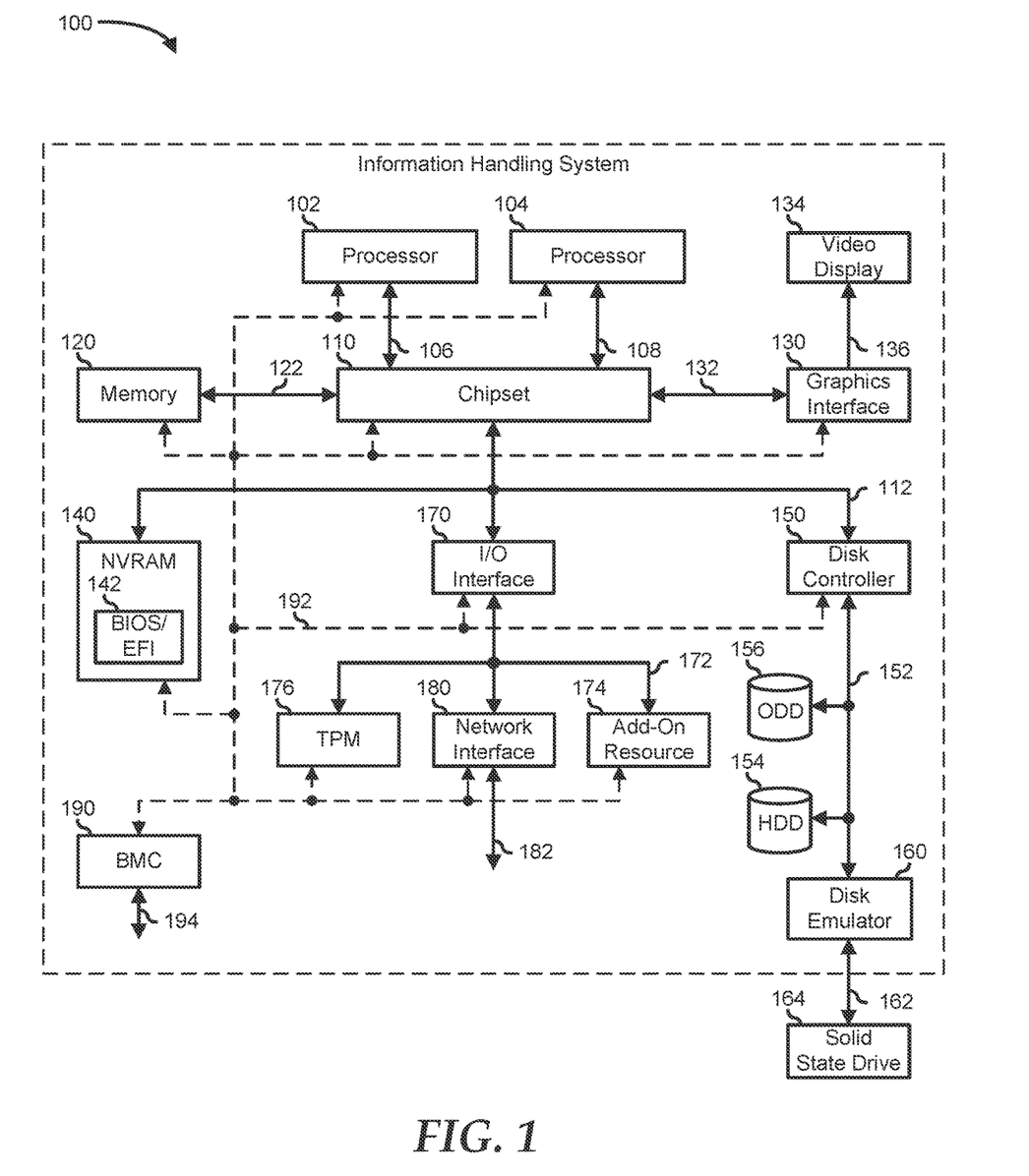
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

When cleaning an information handling system, a user typically locks or turns it off to prevent unexpected data input. As such, the user may wait while the system powers on or returns to a working state before using it. This waiting inconveniences the user. Accordingly, the present disclosure provides a system and method to enable a cleaning mode for information handling systems. This allows the user to clean their system without the need to put it into a locked mode or power it down.

Figure 2:
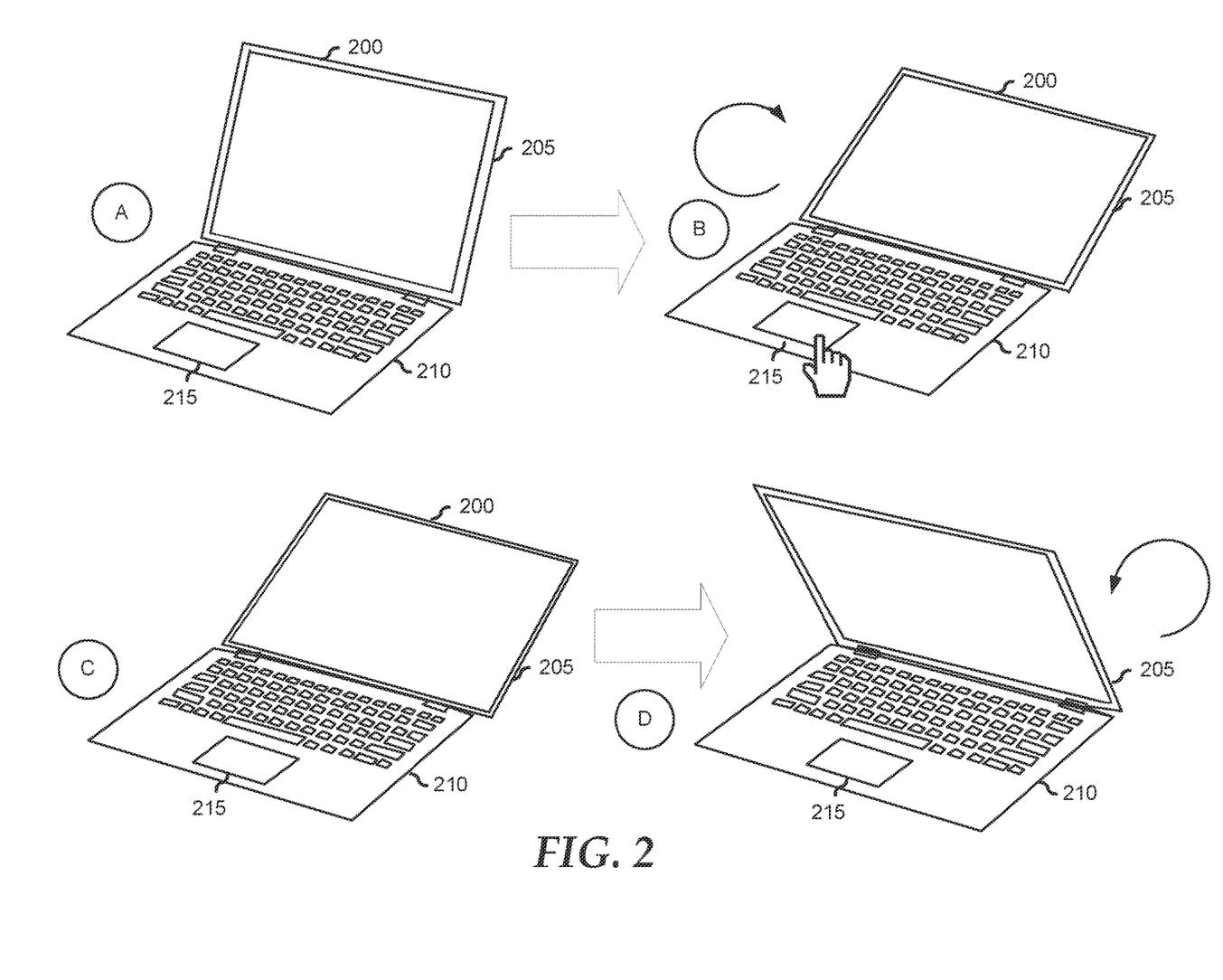
FIG. 2 is a series of perspective views illustrating a portable information handling system configured for a cleaning mode, according to an embodiment of the present disclosure.

FIG. 2 shows a portable information handling system 200 configured for cleaning mode. In one embodiment, information handling system 200 is similar to information handling system 100 of FIG. 1 and maybe a portable information handling system, such as a laptop computer, a 2-in-1 computer, or similar. Information handling system 200 includes a lid panel 205 and a base panel 210. Lid panel 205 may include a display screen while base panel 210 may include human interface devices, such as a touchpad 215 and a keyboard. The display screen may also be a touchscreen device. The touchscreen and touchpad 215 may also be referred to as a touch-based surface or simply a touch surface.

Lid panel 205 may be coupled to base panel 210 via one or more hinges. Lid panel 205 may be moved at various angles relative to base panel 210. For example, information handling system 200 may be closed, wherein lid panel 205 is at approximately zero degrees relative to base panel 210. Information handling system 200 may be open when lid panel 205 is at greater than zero degrees relative to base panel 210. For example, lid panel 205 may be moved to be at a 140-degree or 180-degree angle relative to base panel 210.

FIG. 2 is annotated with a series of letters A through D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

A transition from stage A to stage B shows information handling system 200 entering a cleaning mode. At stage A, information handling system 200 is in an open position, such as in a clamshell configuration, wherein lid panel 205 is at an angle of approximately 90 degrees to 120 degrees. The clamshell configuration is a typical configuration that exposes a display screen for usage to a user. At stage B, information handling system 200 a user moved lid panel 205 to an open position, wherein lid panel 205 is at an angle of approximately 140 degrees to 180 degrees relative to base panel 210. While moving lid panel 205, a user may press touchpad 215 using a finger, pen, stylus, or similar. For example, the user may click and hold a button on touchpad 215.

A transition from stage C to B shows information handling system 200 exiting the cleaning mode, wherein at stage C, information handling system 200 is currently in the cleaning mode. At stage D, the user may move lid panel 205 inward towards base panel 210, such that lid panel 205 may be at an angle of less than 140 degrees relative to base panel 210. At this point, information handling system 200 may no longer be in the cleaning mode.

Although the present disclosure shows a portable information handling system, such as a laptop as an example in the present disclosure, those skilled in the art will understand the principles presented herein may be implemented in a non-portable information handling system. For example, instead of using a touchpad to provide an input to trigger the information handling system to enter the cleaning mode, a user may interact with a touch screen monitor of a desktop, press a button, or press a combination key to trigger the desktop to enter the cleaning mode, disabling the touch screen and switching off the backlight or powering off the monitor.

Figure 3:
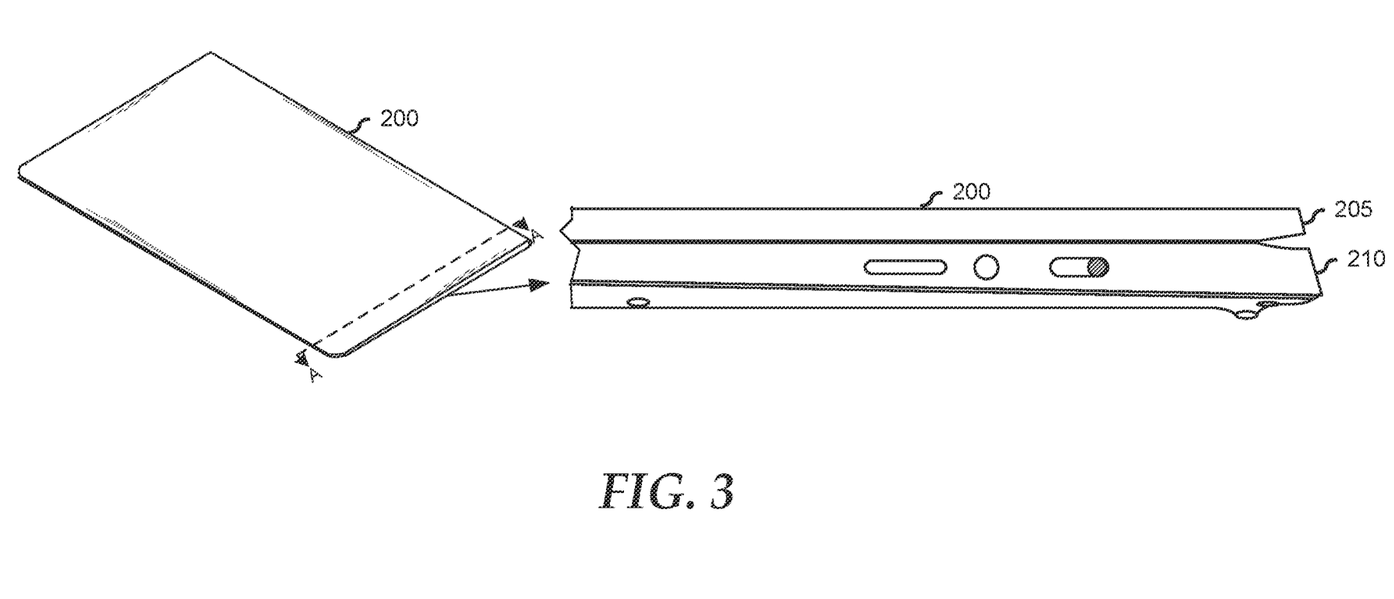
FIG. 3 is a diagram illustrating two views of a portable information handling system, according to an embodiment of the present disclosure.

FIG. 3 shows two views of a portable information handling system 200. In particular, a top perspective view and a side view of information handling system 200 are shown. In this example, information handling system 200 is depicted as having lid panel 205 closed relative to base panel 210.

Figure 4:
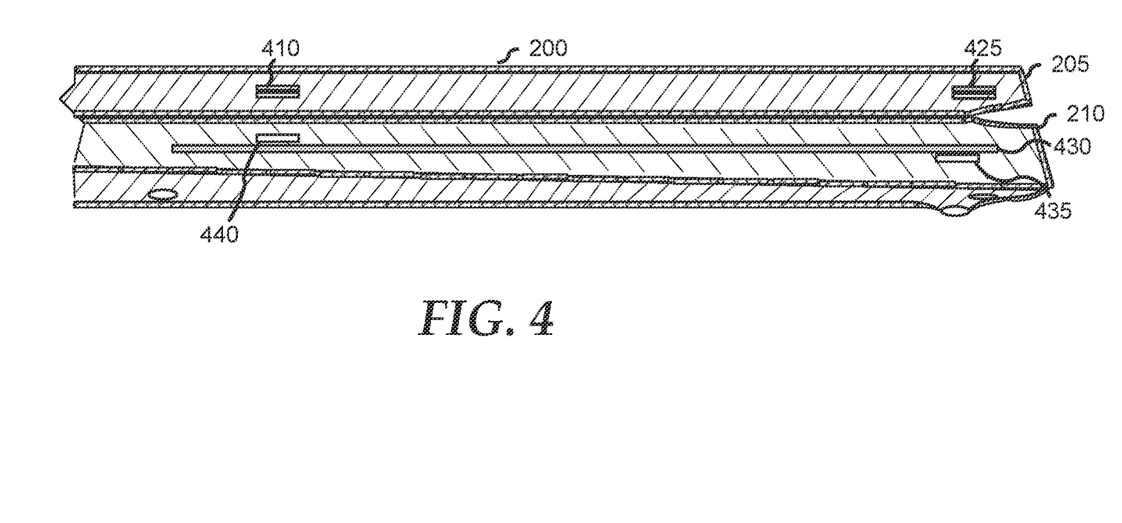
FIG. 4 is a cross-sectional view of a portable information handling system taken along line A-A as shown in FIG. 3, according to an embodiment of the present disclosure.

FIG. 4 shows a cross-sectional view of information handling system 200 taken along line A-A as shown in FIG. 3. Information handling system 200 includes a magnet 410, a magnet 425, a printed circuit board 430, a sensor 435, and a sensor 440. Magnet 410 and magnet 425 may be disposed inside lid panel 205, such that they may align with sensor 440 and sensor 435 respectively. Printed circuit board 430 may be a motherboard or similar used to hold sensors 435 and 440.

Sensor 440 may be disposed of or affixed to printed circuit board 430 inside base panel 210, such that sensor 440 detects a magnetic field associated with magnet 410. Sensor 440 may be configured to detect whether lid panel 205 is open or closed based on the magnetic presence associated with magnet 410. Further, sensor 440 may also be configured to detect whether information handling system 200 is in a closed mode, cleaning mode, or active mode. For example, sensor 440 may be configured to detect whether lid panel 205 is at an angle associated with an active mode, which may be between approximately 50 degrees to 139 degrees relative to base panel 210. Sensor 440 may be in an "OFF" state when there is no magnetic field present. Sensor 440 may also be in an OFF state when there is a magnetic field of insufficient strength or polarity. Accordingly, sensor 440 may be in an "ON" state when subjected to a magnetic field of sufficient strength or polarity. In one embodiment, sensor 440 may be a hall effect sensor or similar.

Sensor 435 may be disposed of or affixed to printed circuit board 430 inside base panel 210, such that sensor 435 detects a magnetic field associated with magnet 425. Sensor 440 may be configured to detect whether lid panel 205 is open or closed based on the magnetic presence associated with magnet 425. Further, sensor 440 may also be configured to detect whether information handling system 200 is in a closed mode, cleaning mode, or active mode. For example, sensor 435 may be configured to detect whether lid panel 205 is at an angle associated with a cleaning mode, which may be between approximately 140 degrees and 180 degrees relative to base panel 210. Sensor 440 may be in an OFF state when there is no magnetic field present. Sensor 440 may also be in an OFF state when there is a magnetic field of insufficient strength or polarity. Accordingly, sensor 440 may be in an ON state when subjected to a magnetic field of sufficient strength or polarity. In one embodiment, sensor 435 may be a giant magnetoresistance (GMR) sensor or similar. It should be appreciated that wherein two sensors and two magnets are illustrated in the figures, one or more sensors and magnets can be utilized depending on the operations desired.

Table 1 below shows a truth table describing the states of sensor 440 and sensor 435 at different positions of lid panel 205. The truth table shows a value of "0" to indicate the OFF state and a value of "1" to indicate an ON state. For example, when lid panel 205 is closed, both sensors 440 and 435 are in the OFF state. When lid panel 205 is open at approximately less than 104 degrees relative to base panel 210, then both sensors 440 and 435 are in the ON state. When lid panel 205 is open at approximately 140 degrees to 180 degrees relative to base panel 210, then sensor 440 is in the ON state while sensor 435 is in the OFF state. At this point, the cleaning mode may be triggered. The cleaning mode may be exited when the user moves lid panel 205 such that its angle relative to base panel 210 is less than 140 degrees. However, the present disclosure is not limited to these aforementioned angles. Instead, the angle that may trigger the cleaning mode may be based on a maximum angle that the lid panel of portable information handling system can be moved to. For example, for convertible information handling systems, the lid angle to trigger the cleaning mode may be from approximately 180 degrees to 360 degrees. In addition, the lid angle, convertible systems may also require the user to interact with the display screen, press a button, or press a combination key. Accordingly, the cleaning mode may be exited when the user moves lid panel 205 such that its relative angle to base panel 210 is less than the maximum angle allowed. The cleaning mode may also be exited when the user interacts with the display screen, presses a button, or presses a combination key.

TABLE 1

|  | Lid Panel Closed | Lid Panel Open at < 140° | Lid Panel at 140° to 180° |
|---|---|---|---|
| Sensor 440 | 0 | 1 | 1 |
| Sensor 435 | 0 | 1 | 0 |

Figure 5:
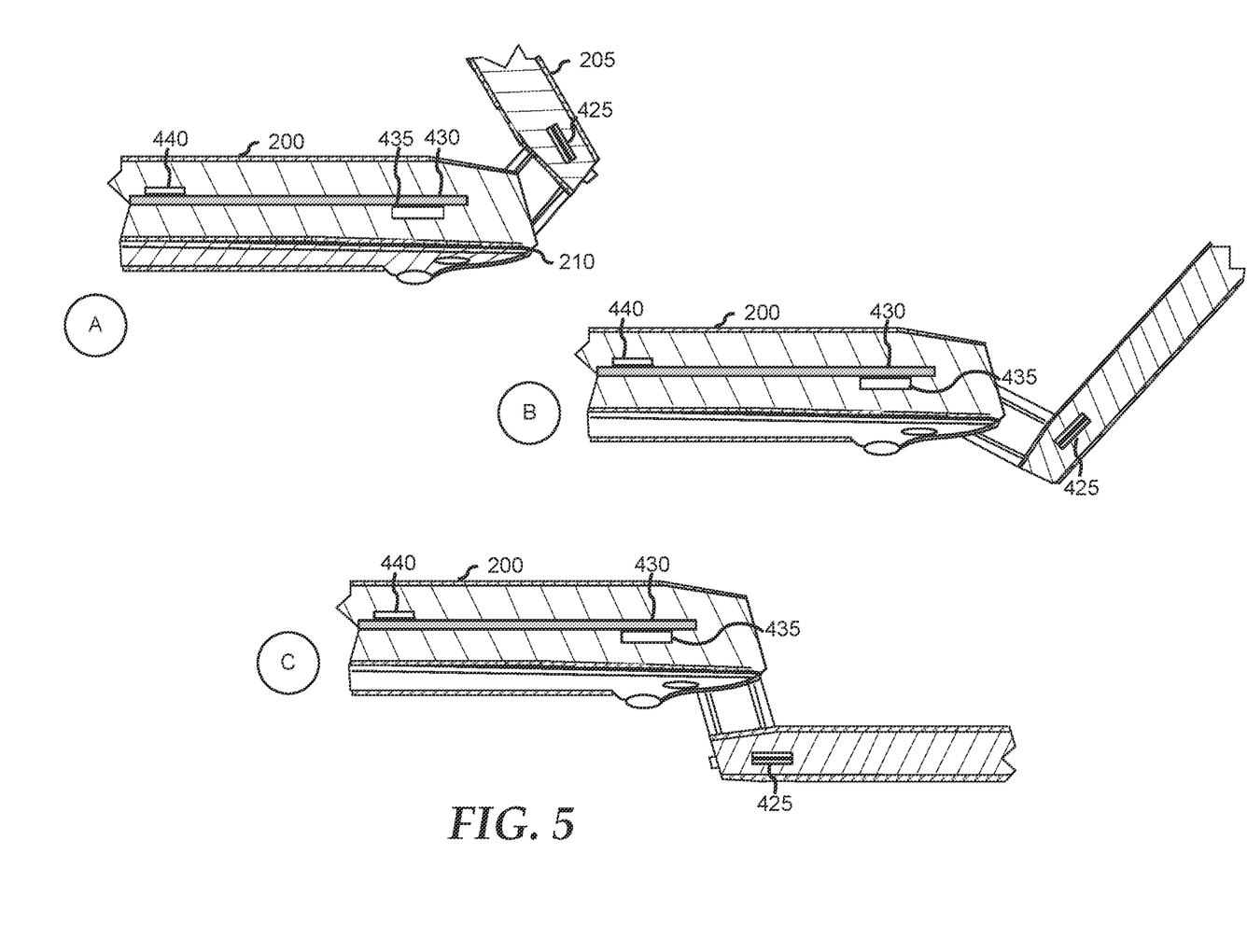
FIG. 5 is a series of cross-sectional views of a portable information handling system with different lid panel positions, according to an embodiment of the present disclosure.

FIG. 5 shows a series of cross-sectional views of information handling system 200 with different lid panel positions. In this example, information handling system 200 is depicted as having lid panel 205 in different open positions. These lid positions may be detected by sensor 440 and/or sensor 435. For example, sensor 435 may detect the position of lid panel 205 relative to base panel 210 based on the strength of the magnetic field, position, and location of magnet 425 relative to sensor 435. Sensor 440 may detect the position of lid panel 205 relative to base panel 210 based on the strength of the magnetic field, position, and location of magnet 410 relative to sensor 440.

At state A, lid panel 205 is at an angle, such that a user may use information handling system 200. For example, lid panel 205 may be at an angle of approximately 85 degrees to 135 degrees relative to base panel 210. At state B, lid panel 205 may be at an angle, such that information handling system 200 may transition to a cleaning mode. For example, lid panel 205 may be at an angle of approximately 140 degrees relative to base panel 210. In one embodiment, a user may move lid panel 205, such that information handling system 200 may transition from state A to state B. At state C, lid panel 205 may be at an angle, such that information handling system 200 may be in the cleaning mode. For example, lid panel 205 may be at an angle of approximately 180 degrees relative to base panel 210. In one embodiment, a user may move lid panel 205, such that information handling system 200 may transition from state A to state B and then to state C.

Figure 6:
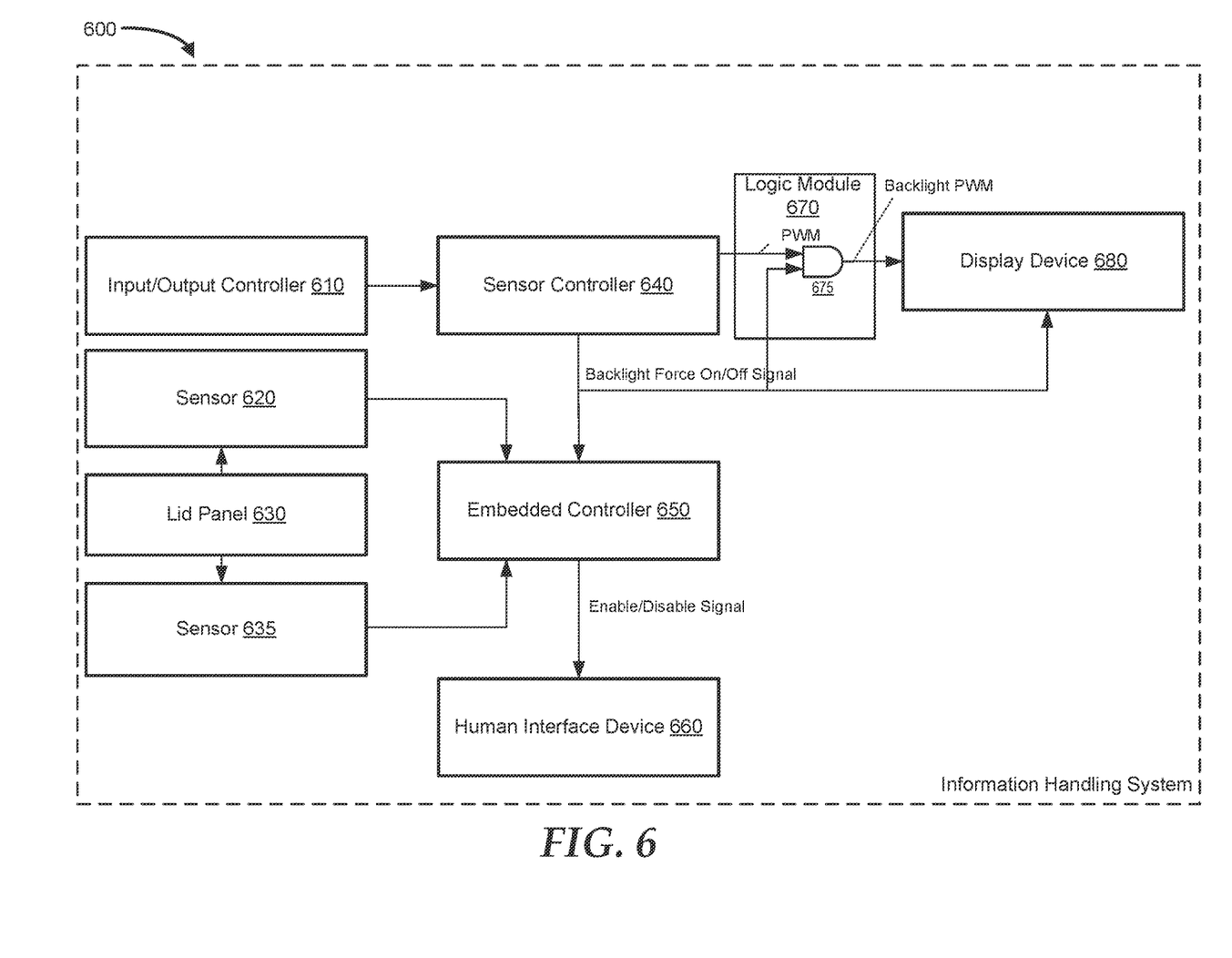
FIG. 6 is a diagram illustrating an information handling system configured for a cleaning mode, according to an embodiment of the present disclosure.

FIG. 6 shows an information handling system 600 configured for cleaning mode. Information handling system 600 is similar to information handling system 200 of FIG. 2. However, information handling system 600 may not be a portable computer. For example, information handling system 600 may be a desktop computer associated with a desktop monitor. Information handling system 600 includes an input/output controller 610, a sensor 620, a lid panel 630, a sensor 635, a sensor controller 640, an embedded controller 650, a human interface device 660, a logic module 670, and a display device 680. Logic module 670 includes a logic gate 675. Embedded controller 650 may be communicatively coupled with sensor controller 640, input/output controller 610, sensor 620, sensor 635, and human interface device 660 via various interfaces such as a general-purpose input/output (GPIO) pin, I²C, SPI communication link, etc. The components shown are not drawn to scale and information handling environment 600 may include additional or fewer components. In addition, connections between components may be omitted for descriptive clarity.

Sensor 620 is similar to sensor 440 of FIG. 4 and may include a hall sensor, a proximity sensor, or similar, operable to detect the position of lid panel 630. The proximity sensor may be an inductive proximity sensor, a capacitive proximity sensor, or similar. Sensor 620 may be operable to detect or sense the position of lid panel 630. In particular, sensor 620 may be a hall effect sensor operable to detect the presence, absence, and/or magnitude of a magnetic field caused by a magnet, similar to magnet 410 of FIG. 4 when lid panel 630 is closed or open at various angles, such as less than 50 degrees in relation to a base. Thus, the motion and relative angle of lid panel 630 may be detected by sensor 620. Accordingly, sensor 620 may provide a sensor signal to embedded controller 650. The sensor signal may be a high-voltage signal or a low-voltage signal. The sensor signal may be a high voltage signal when sensor 620 is in an ON state. The sensor signal may be a low voltage signal when sensor 620 is in an OFF state. The sensor signal may be used by embedded controller 650 to determine the position of lid panel 630 in relation to its base.

Sensor 635 is similar to sensor 435 of FIG. 4 and may include a quantum mechanical magnetoresistance effect (GMR) sensor, a magnetic proximity sensor, an ultrasound proximity sensor, a photoelectric proximity sensor, or similar, operable to detect the presence, absence, and/or magnitude of a magnetic field caused by a magnet, such as magnet 425 of FIG. 4 when lid panel 630 is closed or open at various angles, such as at least 140 degrees in relation to its base. Thus, the motion and relative angle of lid panel 630 may be detected by sensor 635. Accordingly, sensor 635 may provide a sensor signal to embedded controller 650. The sensor signal may be a high-voltage signal or a low-voltage signal. The sensor signal may be a high voltage signal when sensor 635 is in an ON state. The sensor signal may be a low voltage signal when sensor 635 is in an OFF state. The sensor signal may be used by embedded controller 650 to determine the position of lid panel 630 in relation to its base.

Lid panel 630 may include a magnet disposed within similar to magnet 410 and magnet 425 of FIG. 4, such that sensor 620 and sensor 635 may detect or sense the presence or absence of the magnet's magnetic field. Lid panel 630 may also include display device 680 is similar to video display 134 of FIG. 1. Display device 680 may be a liquid crystal display, an organic light emitting diode display, etc. In one embodiment, display device 680 may be backlight by a cold cathode fluorescent lamp, light-emitting diodes, etc. Display device 680 may also include a display screen which may or may not be a touch screen.

Input/output controller 610 may be configured to provide coupling between various input/output devices, such as human interface device 660, processor(s), and/or embedded controller 650. For example, input/output controller 610 may provide information when a keyboard key is pressed or released, a combination key is pressed, or a gesture is detected at a touch surface. When data from a keyboard or touch surface is received, input/output controller 610 may transmit a signal to sensor controller 640. Human interface device 660 may include a keyboard, a touch input device, a fingerprint reader, or similar.

Sensor controller 640 may be configured to provide signals to embedded controller 650, logic module 670, and display device 680 based on the input signal from input/output controller 610. In one example, sensor controller 640 may provide a pulse width modulation (PWM) duty cycle signal to logic module 670. Sensor controller 640 may also provide a backlight force on/off signal to embedded controller 650, logic module 670, and display device 680. The signals provided to logic module 670 may be used to determine whether to adjust the backlight of display device 680. For example, the backlight force on/off signal may be used to mask the PWM duty cycle signal.

Logic module 670 may include logic gate 675. In this example logic gate 675 may be an AND gate, such that if the backlight force on/off signal is a high voltage signal, then the output of logic gate 675 may follow the high/low duty cycle of the PWM signal. If the backlight force on/off signal is a low voltage signal, then the output of logic gate 675 may be a low voltage signal. Thus, the backlight of display device 680 may be dimmed or turned off.

Embedded controller 650, which is similar to BMC 190 of FIG. 1, may be a suitable system, apparatus, or device operable to support various system tasks on behalf of information handling system 600. In particular embedded controller 650 may be or include an electronic hardware device, such as a microcontroller to execute or manage interactions with various sensors for detection of the different positions of lid panel 630, such as whether it is closed or open. Embedded controller 650 may also determine the angle of lid panel 630 relative to a base panel.

Embedded controller 650 may also be configured to determine the different states and/or modes of information handling system 600. For example, embedded controller 650 may determine whether information handling system 600 may be in a working state or otherwise. Embedded controller 650 may also determine whether information handling system 600 is in an active mode, inactive mode, or cleaning mode. Information handling system 600 may be in active mode when it is in a working state. Information handling system 600 may be in inactive mode when it is not in a working state. Information handling system 600 may be in a cleaning mode when it is in a working state, human interface device 660 is disabled, and the backlight of display device 680 is switched off.

Embedded controller 650 may be configured to enable or disable human interface device 660 based on inputs from sensor controller 640, input/output controller 610, sensor 620, and sensor 635. Embedded controller 650 may further provide data or access to data associated with input/output devices of information handling system 600, such as human interface device 660. For example, embedded controller 650 may send a read data command associated with a button event, a key press event, or a touch surface gesture event from input/output controller 610. Embedded controller 650 may also send a write data command to input/output controller 610 to block or unblock data inputs from human interface device 660 and turn off the backlight of display device 680. Embedded controller 650 may also send a write data command to power off or power on display device 680. The commands may be based on the current mode of information handling system 600, whether lid panel 630 is open or closed, and/or its angle relative to the base panel of information handling system 600.

In one example, if information handling system 600 transitions into or is in cleaning mode, then embedded controller 1330 may send an enable/disable signal to disable human interface device 660. In another example, if information handling system 600 transitions out of or is not in the cleaning mode, then embedded controller 650 may send the enable/disable signal to enable human interface device 660. If the enable/disable signal is a low voltage signal then, human interface device 660 may be disabled. Accordingly, if the enable/disable signal is a high voltage signal, then human interface device 660 may be enabled. In another embodiment, instead of embedded controller 1330 transmitting an enable/disable signal to enable/disable human interface device 660, a software command may be transmitted from a software application to human interface device 660 to enable or disable human interface device 660. The software application may receive a signal to enable/disable human interface device 660 from embedded controller 1330 or any other component of information handling system 600.

Embedded controller 650 may determine whether information handling system 600 is in a cleaning mode allowing the user to clean various components of information handling system 600, such as its lid and main housing including a keyboard and touchpad. Upon detection that information handling system 600 is in the cleaning mode, embedded controller 650 may disable the keyboard in the touchpad of information handling system 600. In addition, embedded controller 650 may turn off the display backlight of information handling system 600.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 7:
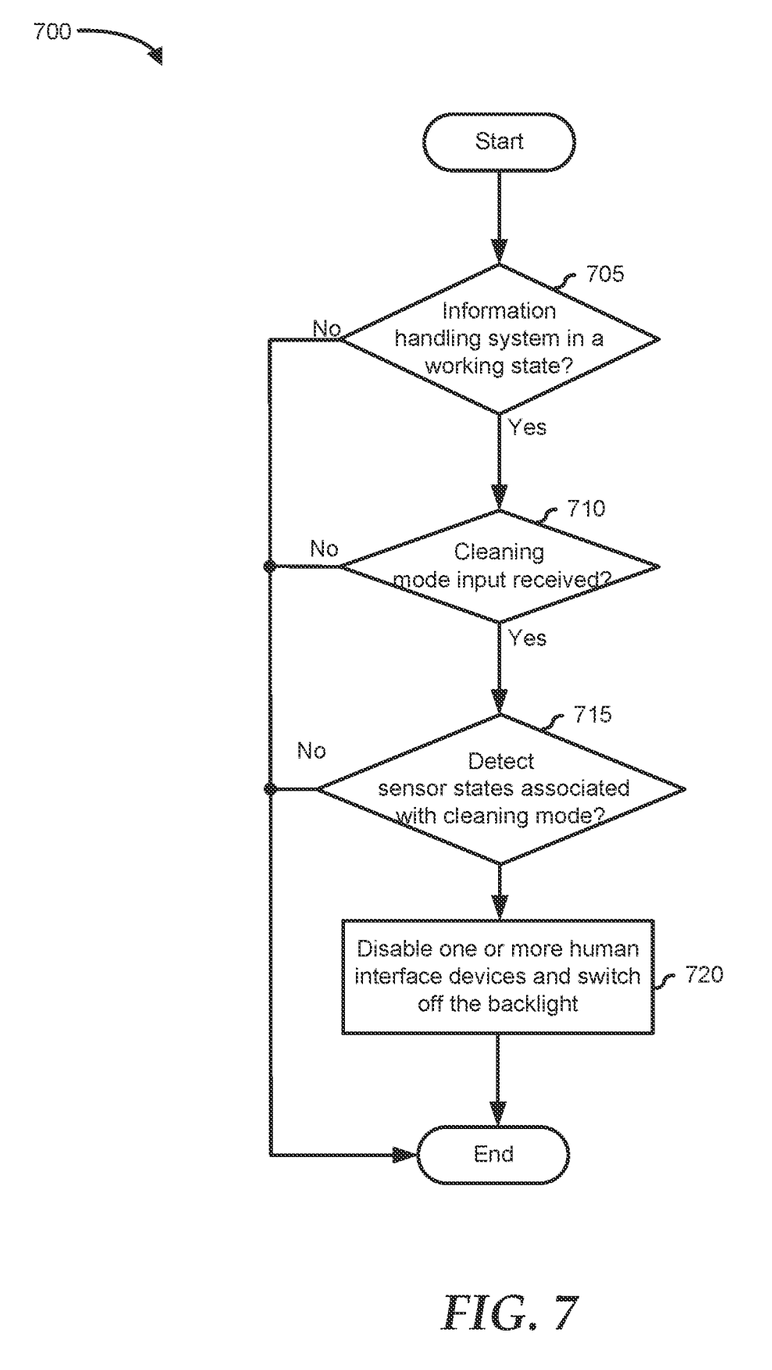
FIG. 7 is a flowchart illustrating a method for entering a cleaning mode, according to an embodiment of the present disclosure.

FIG. 7 shows a flowchart of a method 700 for entering a cleaning mode. Method 700 may be performed by one or more components of information handling system 600 of FIG. 6. For example, one or more blocks of method 700 may be performed by embedded controller 650. However, while embodiments of the present disclosure are described in terms of information handling system 600 of FIG. 6, it should be recognized that other systems may be utilized to perform the described method. One of skill in the art will appreciate that this flowchart explains a typical example, which can be extended to advanced applications or services in practice.

Method 700 typically starts at decision block 705 where the method determines whether an information handling system is in a working state, also referred to as a G0 or S0 state. If the information handling system is in a working state, then the "YES" branch is taken and the method proceeds to decision block 710. If the information handling system is not in a working state, then the "NO" branch is taken and the method ends.

At decision block 710, the method determines if a cleaning mode input is received, such as by the embedded controller. The cleaning mode input may be a signal from a human interface device via a sensor controller, one or more sensors, or a software application to indicate that the information handling system is to be put in a cleaning mode. For example, the cleaning mode input may be a signal from a touchpad, a key combination from a keyboard, a combination of signals from the touchpad and the keyboard, a signal from a software application, a signal from a touchscreen, a combination of signal from the touchpad and the touchscreen, a combination of signal from the touchscreen and the keyboard, or similar. In one embodiment, a signal may be transmitted from a touch surface based on a particular gesture, such as a movement of a single finger across a touchpad or a touch screen. In another embodiment, a signal may be transmitted from a keyboard when a particular key or key combination is pressed. If a cleaning mode input is received, then the "YES" branch is taken and the method proceeds to decision block 715. If a cleaning mode input is not received, then the "NO" branch is taken and the method ends.

At decision block 715, the method may detect whether the states of one or more sensors indicate that the information handling system is in a cleaning mode. The information handling system may be in the cleaning mode if the angle of the lid panel relative to the base panel is approximately 140 degrees or greater. The method may receive signals associated with the magnetic states of one or more sensors associated with the lid panel. In particular, the method may determine whether a first sensor, such as sensor 620 of FIG. 6 or sensor 440 of FIG. 4, is in an ON state while a second sensor, such as sensor 635 of FIG. 6 or sensor 435 of FIG. 4, is in an OFF state. If the states of one or more sensors are associated with the cleaning mode, then the "YES" branch is taken and the method proceeds to block 720. If the states of one or more sensors are not associated with the cleaning mode, then the "NO" branch is taken and the method ends.

At block 720, the information handling system may enter into the cleaning mode. When the information handling system is in the cleaning mode, the embedded controller may disable one or more human interface devices, such as a keyboard or a touch surface which may be a touchpad and/or a touch screen. This may prevent accidental user inputs while the user is cleaning the computer. To disable the human interface device, the embedded controller may transmit a command to the input/output controller or transmit a signal to a general-purpose input/output pin. In addition to disabling the human interface device, the method may turn off the backlight or power off the display device. Turning off the backlight may allow the user to better see the dust on the display device.

Figure 8:
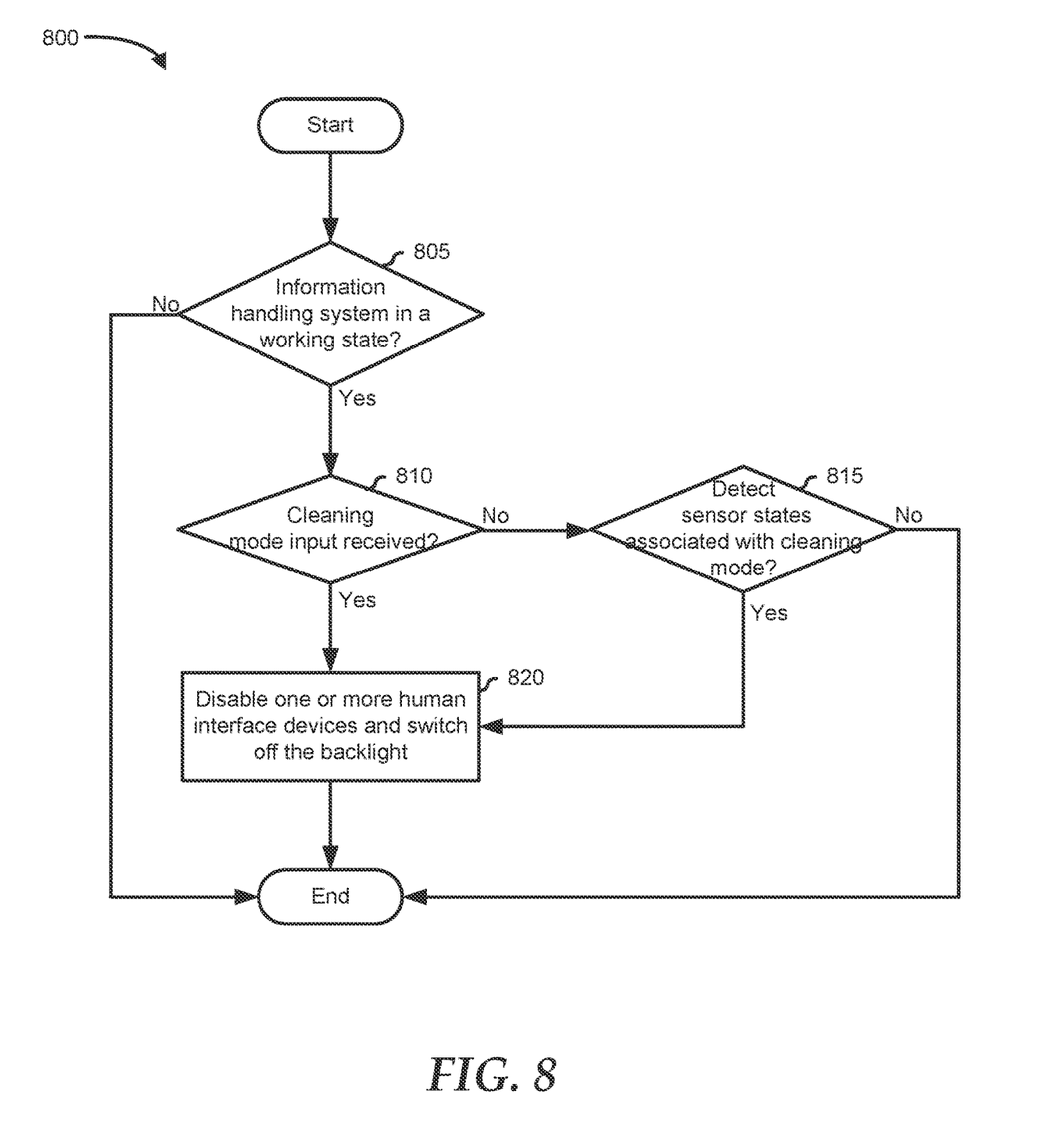
FIG. 8 is a flowchart illustrating a method for entering to a cleaning mode, according to an embodiment of the present disclosure.

FIG. 8 shows a flowchart of a method 800 for entering a cleaning mode. Method 800 may be performed by one or more components of information handling system 600 of FIG. 6. In particular, one or more blocks of method 800 may be performed by embedded controller 650. However, while embodiments of the present disclosure are described in terms of information handling system 600 of FIG. 6, it should be recognized that other systems may be utilized to perform the described method. One of skill in the art will appreciate that this flowchart explains a typical example, which can be extended to advanced applications or services in practice.

Method 800 typically starts at decision block 805 where the method determines whether the information handling system is in a working state. If the information handling system is in a working state, then the "YES" branch is taken and the method proceeds to decision block 810. If the information handling system is not in a working state, then the "NO" branch is taken and the method ends.

At decision block 810, the method determines whether a cleaning mode input is received from an input/output device and/or a software application. If a cleaning mode input is received, then the "YES" branch is taken and the method proceeds to block 820. If a cleaning mode input is not received, then the "NO" branch is taken and the method proceeds to decision block 815.

At decision block 815, the method may detect whether the states of one or more sensors indicate that the information handling system is in a cleaning mode. If the states of one or more sensors are associated with the cleaning mode, then the "YES" branch is taken and the method proceeds to block 820. If the states of one or more sensors are not associated with the cleaning mode, then the "NO" branch is taken and the method ends. At block 820, the method may disable one or more human interface devices. In addition, the method may turn off the backlight or power off the display device.

Figure 9:
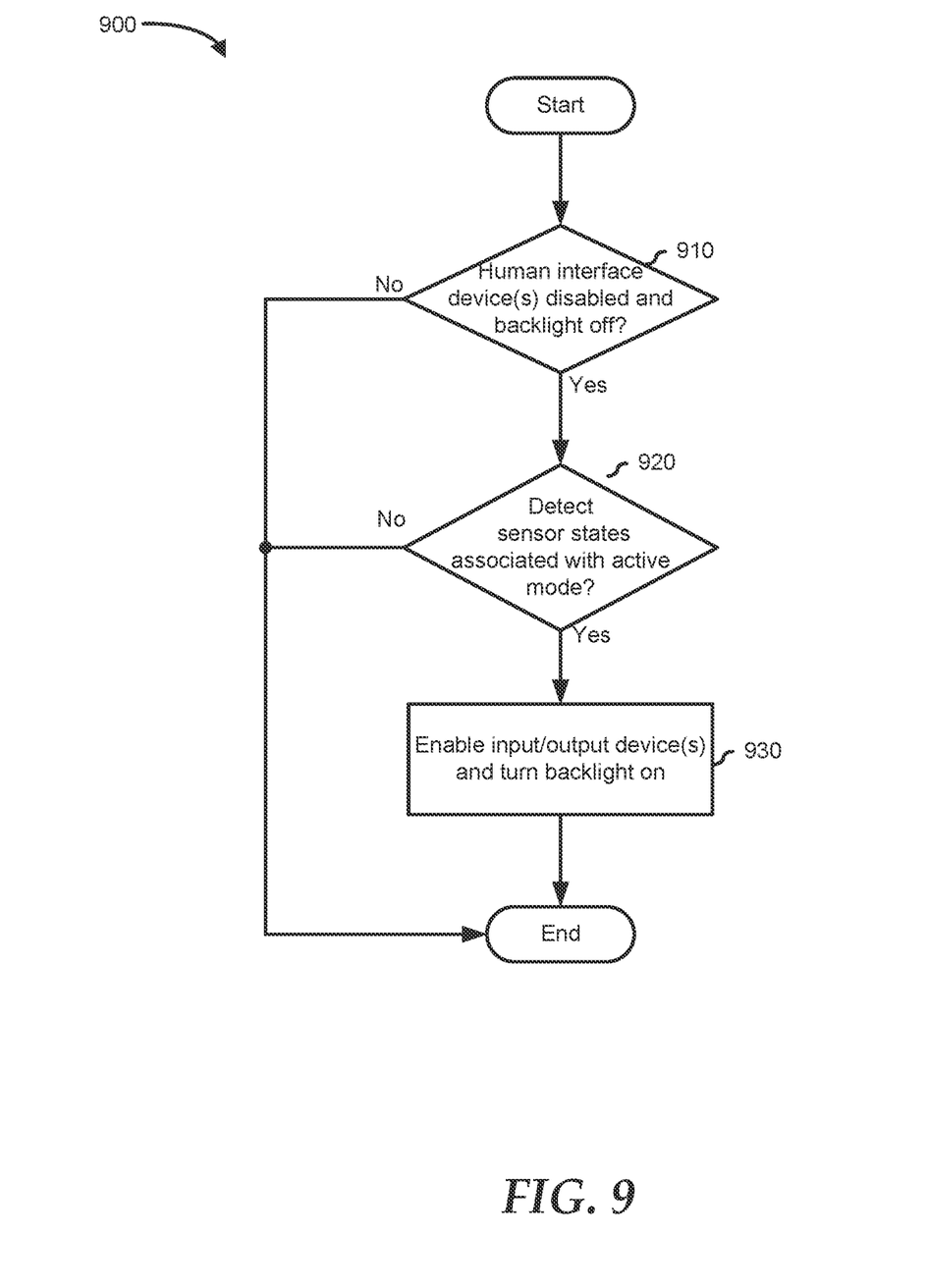
FIG. 9 is a flowchart illustrating a method for exiting a cleaning mode, according to an embodiment of the present disclosure.

FIG. 9 shows a flowchart of a method 900 for exiting from a cleaning mode. Method 900 may be performed by one or more components of information handling system 600 of FIG. 6. In particular, method 900 may be performed by embedded controller 650 of FIG. 6. However, while embodiments of the present disclosure are described in terms of information handling system 600 of FIG. 6, it should be recognized that other systems may be utilized to perform the described method. One of skill in the art will appreciate that this flowchart explains a typical example, which can be extended to advanced applications or services in practice.

Method 900 typically starts at decision block 910 where the method determines whether the input/output device(s) of the information handling system is disabled and the backlight of the display device is turned off. In particular, the embedded controller may determine whether a keyboard and a touchpad of the information handling system are disabled. In addition, the embedded controller may also determine whether the backlight of the display device is turned off. If the input/output device(s) are disabled and the backlight is turned off, then the "YES" branch is taken and the method proceeds to decision block 920. If the input/out devices(s) are not disabled or the backlight is not turned off, then the "NO" branch is taken and the method ends.

At decision block 920, the method determines whether the lid panel is in an active position. In particular, the embedded controller may determine whether the lid panel is in an active position. The lid panel of the information handling system may be in an active position if both a first sensor and a second sensor are in an ON state. In one embodiment, the first sensor may be similar to sensor 620 of FIG. 6 or sensor 440 of FIG. 4. The second sensor may be similar to sensor 635 of FIG. 6 or sensor 435 of FIG. 4.

At block 930, the method may enable one or more input/output device(s) and turn the backlight of the display device on. In particular, the embedded controller may transmit a signal to enable a keyboard and a touchpad of the information handling system. In addition, the sensor controller may transmit a backlight force on/off signal to switch on the backlight of the display device. In addition, the method may also switch the power on the display device before turning the backlight on. After enabling one or more input/output device(s) and turning on the backlight, the method ends.

Figure 10:
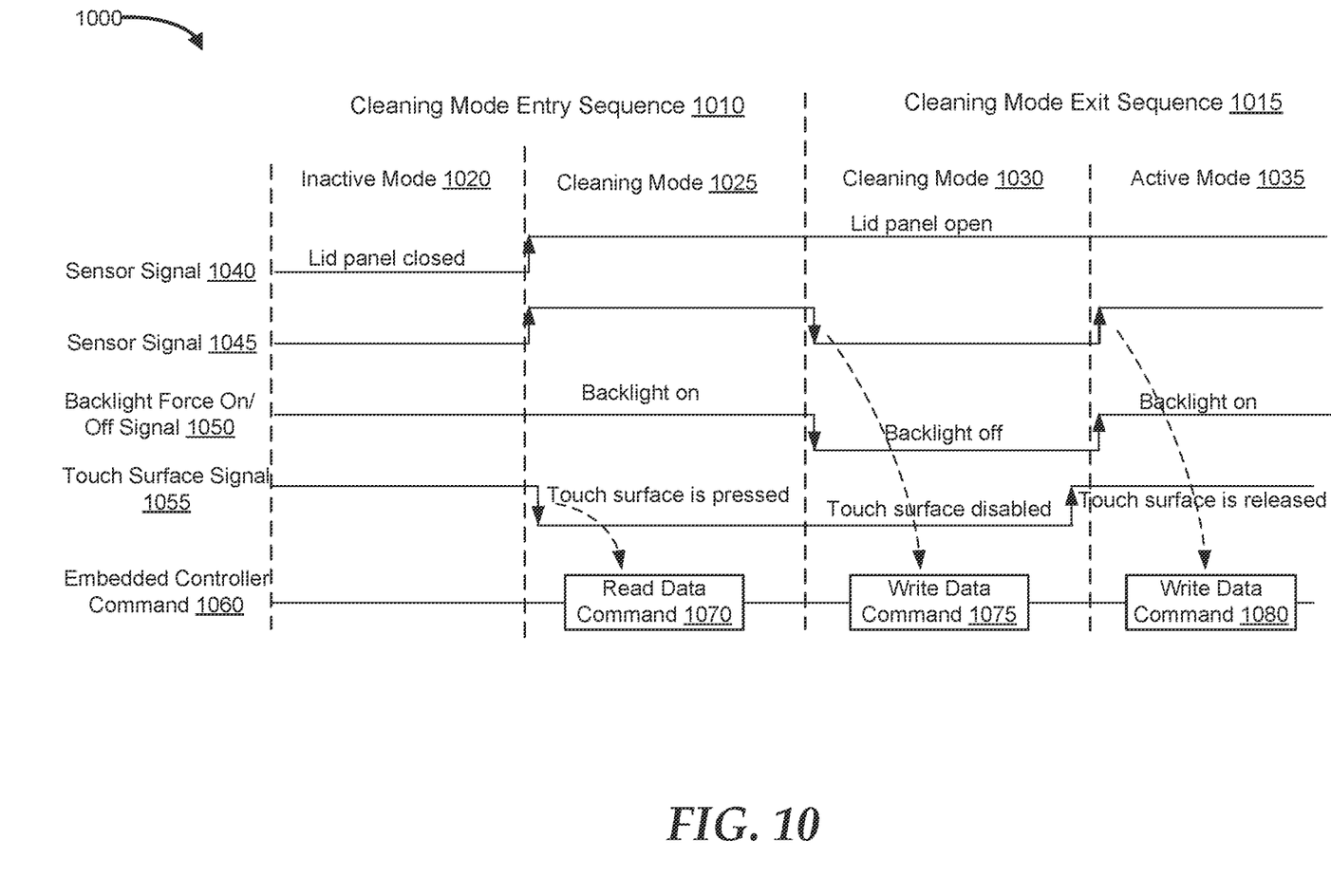
FIG. 10 is a diagram illustrating a control sequence during entrance to and exit from a cleaning mode.

FIG. 10 shows a diagram of a control sequence 1000 during entrance to and exit from a cleaning mode. Control sequence 1000 includes a cleaning mode entry sequence 1010 and a cleaning mode exit sequence 1015. Cleaning mode entry sequence 1010 includes a transition from an inactive mode 1020 to a cleaning mode 1025. Cleaning mode exit sequence 1015 includes a transition from a cleaning mode 1030 to an active mode 1035.

Sensor signal 1040 may be a high or low voltage signal from a sensor similar to sensor 620 of FIG. 6 and sensor 440 of FIG. 4. Sensor signal 1045 may be a high or low voltage signal from a sensor similar to sensor 635 of FIG. 6 and sensor 435 of FIG. 4. Backlight force on/off signal 1050 may be a high or low voltage signal from a sensor controller similar to sensor controller 640 of FIG. 6. Touch surface signal 1055 may be a high or low-voltage signal from a touchpad, a touchscreen, or a similar touch surface of the information handling system. Touch surface signal may be transmitted to an input/output controller similar to input/output controller 610 of FIG. 6. Embedded controller command 1060 may be a read command, a write command, or similar that is transmitted by an embedded controller similar to embedded controller 650 of FIG. 6. The embedded controller may use the commands to communicate with components of the information handling system, such as an input/output device, a display device, an input/output controller, a sensor controller, etc.

The information handling system may be in an inactive mode 1020 when the portable information handling system is in a closed position, such that a lid panel is at zero degree angle relative to a base panel. At inactive mode 1020, both sensor signal 1040 and sensor signal 1045 may be low voltage signals while both backlight force on/off signal 1050 and touch surface signal 1055 may be high voltage signals. At this point, the embedded controller may not send a command.

The information handling system may transition from inactive mode 1020 to cleaning mode 1025. The transition may be triggered by an event, such as receiving a cleaning mode input or a change in the position of the lid panel, such as when the lid panel is opened at approximately 140 degrees relative to the base panel. At cleaning mode 1025, sensor signal 1040, and sensor signal 1045 may transition to high voltage signals while backlight force on/off signal 1050 may remain as a high voltage signal, which keeps the backlight on. Touch surface signal 1055 may transition to a low voltage signal when a user interacts with a touch surface. For example, a button on the touch surface may be pressed by a finger, a stylus, or a pen. This may trigger the embedded controller to send a read data command 1070 to an input/output controller. At this point, the embedded controller may read data from the input/output controller that indicates the gesture and/or interaction performed by the user on the touch surface.

The information handling system may transition from cleaning mode 1025 to cleaning mode 1030. The transition may be triggered by an event, such as receiving a cleaning mode input or a change in the position of the lid panel. For example, the user may further open the lid panel from an angle of approximately 140 degrees to an angle of approximately 180 degrees relative to the base panel. At cleaning mode 1030, both sensor signal 1045 and backlight force on/off signal 1050 may transition to a low voltage signal. At this point, the sensor signal 1045 may trigger the embedded controller to transmit write data command 1075 to one or more human interface devices. Data command 1075 may be used to disable the human interface devices, switch off the backlight, or switch off the power to the display device. The sensor controller may transmit backlight force on/off signal 1050 as a low voltage signal, which may switch off the backlight of the display device or switch off the power to the display device instead of the embedded controller.

The information handling system may transition from cleaning mode 1030 to active mode 1035. The transition may be triggered by an event, such as receiving a cleaning mode input, or a change in the position of the lid panel, such as when the lid panel is moved to a clamshell or 180-degree configuration. In particular, the information handling system may transition to active mode 1035 when the lid panel is moved to approximately less than 140 degrees relative to the base panel. The information handling system may also transition to active mode 1035 when the lid panel or exit its maximum angle relative to the base panel. For example, for laptops where the maximum angle of the lid panel is 180 degrees relative to the base panel, the transition to active mode may be triggered by moving the lid panel to an angle of less than 180 degrees. In another embodiment, the information handling system may transition to active mode on receipt of a command or input from one or more sources. For example, like the cleaning mode input, the command or input may be a signal from a touchpad, a key combination from a keyboard, a combination of signal from the touchpad and the keyboard, a signal from a software application, a signal from a touchscreen, a combination of signal from the touchpad and the touchscreen, a combination of signal from the touchscreen and the keyboard, or similar.

At this point, sensor signal 1040 may stay at a high voltage signal as the lid panel is still in the open position. Touch surface signal 1055 may transition to a high voltage signal as the pressure applied to the touch surface is released. For example, the finger, stylus, or pen may be lifted off from the touch surface. Sensor signal 1045 may transition to a high voltage signal, as the sensor associated with sensor signal 1045 may sense that the angle of the lid panel is less than 140 degrees. The high voltage signal may trigger the embedded controller to send a write data command 1080 to enable one or more human interface devices. Write data command 1080 may also be transmitted to switch on the backlight and/or power on the display device. At this point, backlight force on/off signal 1050 may transition to a high voltage signal as the touch surface is released from the user's interaction. The high-voltage signal may switch on the backlight and/or power on the display device.

Although FIG. 7, FIG. 8, and FIG. 9 show example blocks of method 700, method 800, and method 900 in some implementations, method 700, method 800, and method 900 may include additional blocks, fewer blocks, different blocks, or differently arranged blocks than those depicted in FIG. 7, FIG. 8, and FIG. 9. Those skilled in the art will understand that the principles presented herein may be implemented in any suitably arranged processing system. Additionally, or alternatively, two or more of the blocks of method 700, method 800, and method 900 may be performed in parallel. For example, decision blocks 705 and 710 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    detecting, by a processor, that a portable information handling system is in a working state;
    detecting an event indicating a transition of the portable information handling system from a first mode to a second mode while the portable information handling system is in the working state, wherein the first mode is associated with a first angle of a first open position of a lid panel of the portable information handling system and the second mode is associated with a second angle of a second open position of the lid panel of the portable information handling system, and wherein the event indicates a change from the first angle of the first open position of the lid panel to the second angle of the second open position of the lid panel; and
    in response to detecting the event:
        transitioning the portable information handling system from the first mode to the second mode;
        disabling a keyboard and a touch surface of the portable information handling system; and
        switching off a backlight of a display device of the portable information handling system.

2. The method of claim 1, wherein the event includes a user interacting with a touch-based surface.

3. The method of claim 1, wherein the event includes receiving a command from a software application.

4. The method of claim 1, wherein the change from the first angle to the second angle of the lid panel is relative to a base panel of the portable information handling system.

5. The method of claim 1, wherein the second angle is between 140 degrees and 180 degrees.

6. The method of claim 1, wherein the change is detected simultaneously with detecting the event.

7. The method of claim 1, wherein detecting the event includes receiving a signal from a giant magnetoresistance sensor.

8. The method of claim 4, further comprising detecting another change from the second angle of the lid panel to a third angle relative to the base panel of the portable information handling system.

9. The method of claim 8, further comprising in response detecting the other change, enabling the keyboard and the touch surface and switching on the backlight of the display device.

10. An information handling system, comprising:
    a processor; and
    a memory storing instructions that when executed cause the processor to perform operations including:
        detecting that the information handling system is in a working state;
        detecting an event indicating a transition of the information handling system from a first mode to a second mode while the information handling system is in the working state, wherein the first mode is associated with a first angle of a first open position of a lid panel of the information handling system and the second mode is associated with a second angle of a second open position of the lid panel of the information handling system, and wherein the event indicates a change from the first angle of the first open position of the lid panel to the second angle of the of the second open position of the lid panel; and
        in response to detecting the event:
            transitioning the information handling system from the first mode to the second mode;
            disabling a keyboard and a touch surface device of the information handling system; and
            switching off a backlight of a display device associated with the information handling system.

11. The information handling system of claim 10, wherein the event is triggered by a user interacting with a touch-based surface.

12. The information handling system of claim 10, wherein the event is triggered by receiving a command from a software application.

13. The information handling system of claim 10, wherein the event is triggered by a user pressing a keyboard key.

14. The information handling system of claim 12, wherein the event is triggered by a combination of a user interacting with a touch-based surface and pressing a keyboard key.

15. A non-transitory computer-readable medium to store instructions that are executable to perform operations comprising:
    detecting an event indicating a transition of a portable information handling system from a first mode to a second mode while the portable information handling system is in a working state, wherein the first mode is associated with a first angle of a first open position of a lid panel of the portable information handling system and the second mode is associated with a second angle of a second open position of the lid panel of the portable information handling system, and wherein the event indicates a change from the first angle of the first open position of the lid panel to the second angle of the second open position of the lid panel; and
    in response to detecting the event:
        transitioning the portable information handling system from the first mode to the second mode;
        disabling a keyboard and a touch surface of the portable information handling system; and switching off a backlight of a display device of the portable information handling system.

16. The non-transitory computer-readable medium of claim 15, wherein the event includes a user interacting with a touch-based surface.

17. The non-transitory computer-readable medium of claim 15, wherein the change from the first angle to the second angle of the lid panel is relative to a base panel of the portable information handling system.

18. The non-transitory computer-readable medium of claim 15, wherein the second angle is between 140 degrees and 180 degrees.

19. The non-transitory computer-readable medium of claim 15, wherein the change is detected simultaneously with detecting the event.

20. The non-transitory computer-readable medium of claim 15, wherein detecting the change includes receiving a signal from a giant magnetoresistance sensor.

* * * * *